G. W. PICKARD.
WIRELESS RECEIVING IMPROVEMENT.
APPLICATION FILED AUG. 1, 1910.
1,156,625.
Patented Oct. 12, 1915.
3 SHEETS—SHEET 1.
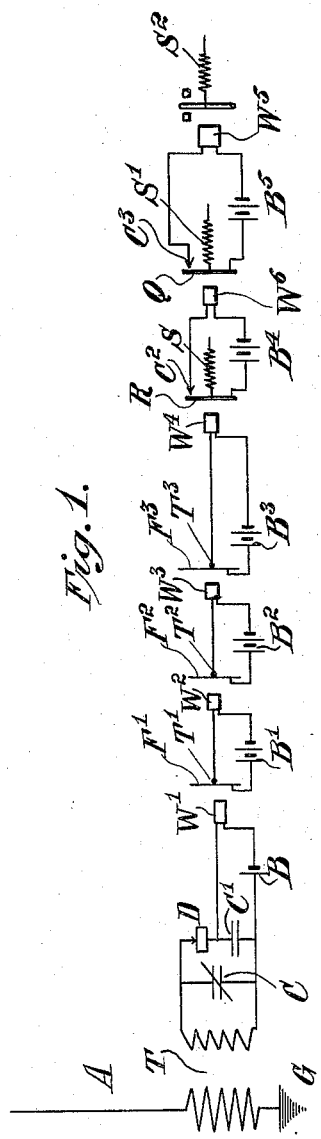
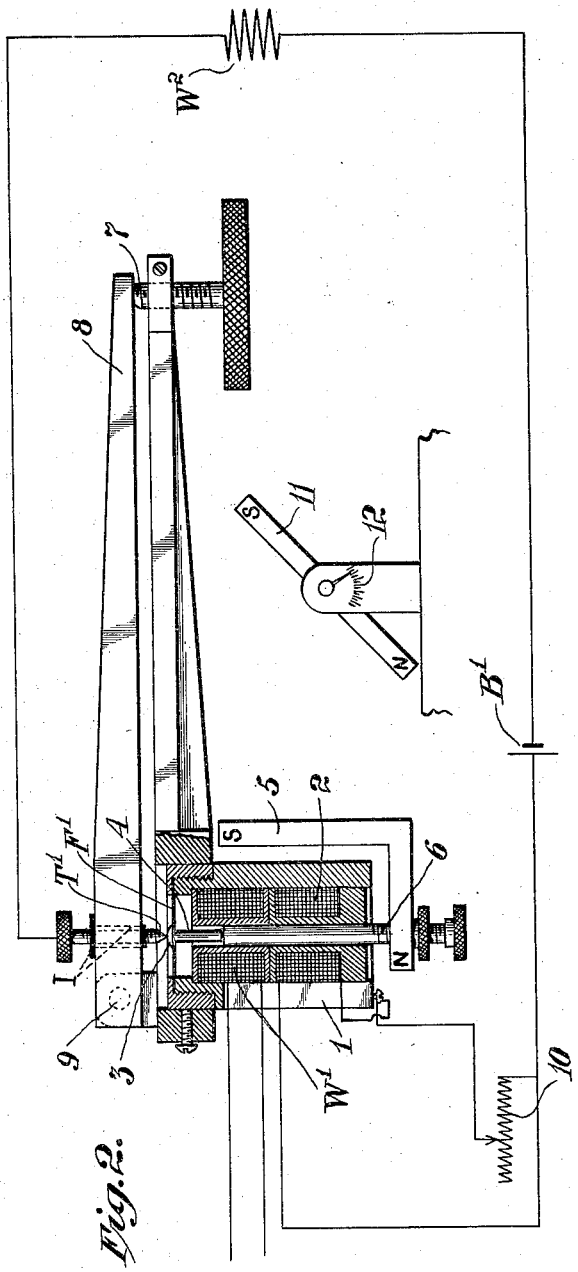
Attest:
Inventor:
Greenleaf Whittier Pickard
by
Atty

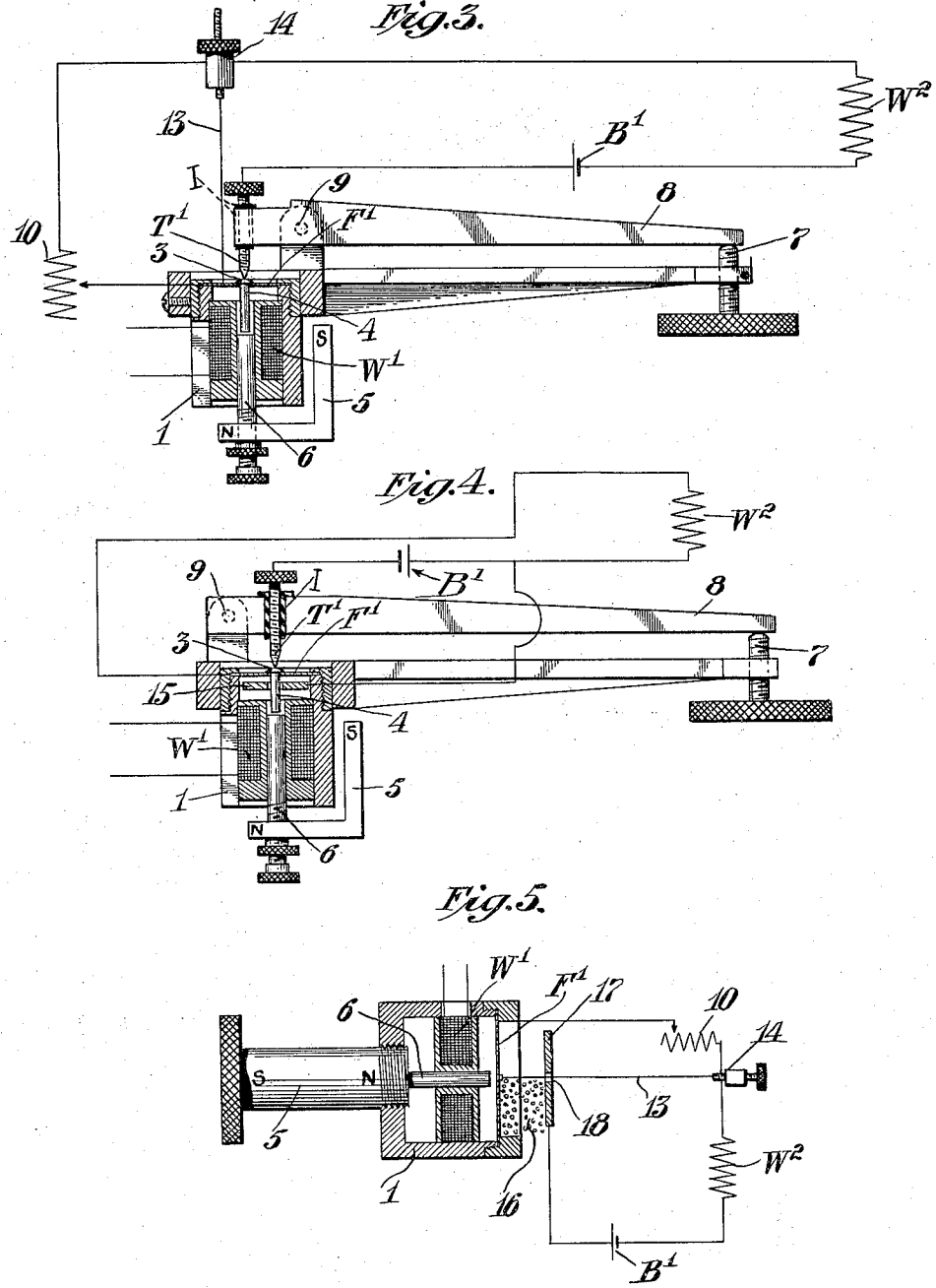

G. W. PICKARD.
WIRELESS RECEIVING IMPROVEMENT.
APPLICATION FILED AUG. 1, 1910.
1,156,625.
Patented Oct. 12, 1915.
3 SHEETS—SHEET 3.
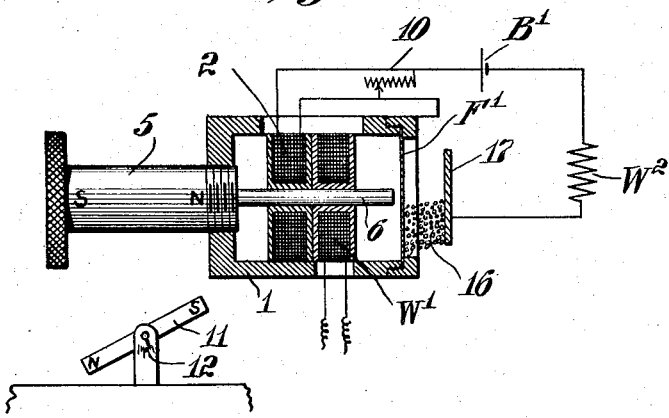
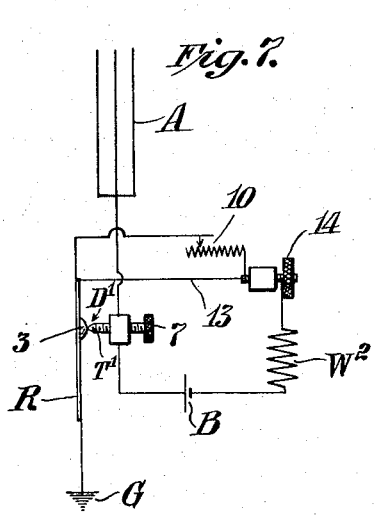
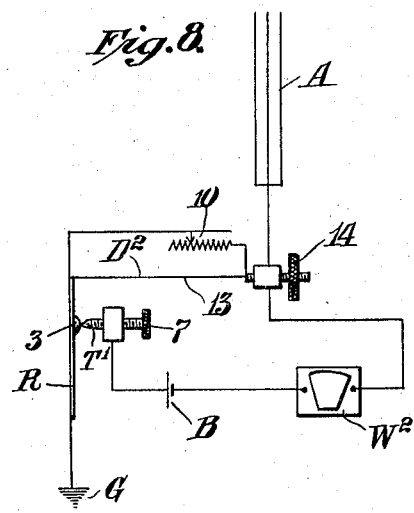
Attest:
Inventor:
Greenleaf Whittier Pickard
by
Atty

UNITED STATES PATENT OFFICE.

GREENLEAF WHITTIER PICKARD, OF AMESBURY, MASSACHUSETTS, ASSIGNOR TO WIRELESS SPECIALTY APPARATUS COMPANY, OF NEW YORK, N. Y., A CORPORATION OF NEW YORK.

WIRELESS RECEIVING IMPROVEMENT.

1,156,625.     Specification of Letters Patent.     Patented Oct. 12, 1915.

Application filed August 1, 1910. Serial No. 574,778.

*To all whom it may concern:*

Be it known that I, GREENLEAF WHITTIER PICKARD, a citizen of the United States of America, and a resident of Amesbury, Massachusetts, have invented certain new and useful Wireless Receiving Improvements, the principles of which are set forth in the following specification and accompanying drawing, which disclose the form of the invention which I now consider to be the best of the various forms in which the principles of the invention may be embodied.

This invention relates to improvements in receiving messages and signals by wireless telegraphy and telephony.

The principal object is to increase the efficiency and dependability of such reception.

The invention consists of the apparatus and methods hereinafter disclosed.

Of the drawings, Figure 1 is a diagrammatic illustration of the apparatus at a fully-equipped receiving installation; Figs. 2–6 are vertical elevations, partly in section, of amplifying devices suitable for the devices $W^1$, $T^1$, etc., of Fig. 1; Fig. 2 showing an electro-magnetically controlled single-contact microphone; Fig. 3 a thermal-wire controlled single-contact microphone; Fig. 4 an electrostatically controlled single-contact microphone; Fig. 5 a thermal-wire controlled multiple-contact or carbon button microphone; Fig. 6 an electromagnetically controlled multiple-contact or carbon button microphone; and Figs. 7 and 8 are diagrams showing the adaptation as a wireless detector (in place of rectifier D of Fig. 1) of such microphonic device structures or combinations as those of Figs. 2–6.

In Fig. 1, A may be any suitable antenna, which may be grounded at G, and connected with the receiving apparatus by any usual oscillation transformer as T. If the secondary oscillation circuit, as the circuit through the transformer secondary and the condenser C, is to be tuned to antenna A, then the rectifying detector D, (one of my well-known good-contact devices wherein one or both of the contact members possesses rectifying power) is connected in shunt to the tuned circuit, as shown. It has been customary to connect across condenser $C^1$ (which is in series with D) a telephone receiver, to be operated by the direct current pulses furnished from the oscillatory currents in the tuned circuit, by means of the rectifier D; the condenser $C^1$ being used to provide a path through D for the oscillations, without short-circuiting the telephone receiver connected across $C^1$; and the local source B being such as to increase the rectifying efficiency of D, in accordance with the invention of my Patent 912,613, but not to furnish energy for the operation of the receiving telephone. This has been very satisfactory indeed for the commercial business of the past and up to the present; but the present invention has for its result to increase the ultimate efficiency thirty or forty times or more, and furthermore the former arrangement, practically limited to the use of the telephone receiver, has certain disadvantages, among which is the fact that the telephone must always be at the operator's ears if any business is to be done. One reason why the telephone alone has been used with my rectifier detector is that there was no other instrument which was efficient enough to be operated by the rectified currents under usual and general commercial conditions.

In accordance with this invention the rectified currents are amplified before being led to a telephone receiver, and preferably, they are amplified so that they have sufficient strength to operate a controlling switch for any desired translating device other than a telephone and constituting a telegraphic receiving instrument, such as an ordinary Morse sounder, a call-bell, a signaling lamp, etc. I have found, however, that the mere amplification is not adequate, of itself, to satisfactorily accomplish the operation of such controlling switch, on account of the fact that the pulsatory character of the rectified currents is carried through the process of amplification, and that the inertia of the controlling switch will not permit its satisfactory operation by such pulsatory currents. In accordance with the invention, therefore, the pulsatory currents are changed to currents constituting direct makes and breaks corresponding in duration to the duration of the signals; this being done between the steps of rectification and of operating the controlling switch. First, instead of connecting a telephone receiver across condenser $C^1$ (Fig. 1), one of the devices of Figs. 2–6 is connected as shown at $W^1$, $F^1$, $T^1$ of Fig. 1, where coil $W^1$ and diaphragm $F^1$ constitute the receiver element (similar to a telephone receiver) and $T^1$ is an adjustable electrode or contact of a suitable microphone transmitter. I have found that with one of these devices, the rectified pulsatory current pulses from rectifier D can be amplified at least thirty to forty times as the present upper limit so far accomplished by me. If now the ordinary telephone receiver heretofore used at $W^1$, be placed at $W^2$, the amplification by $W^1$, $F^1$, $T^1$ permits an enormous increase of the distance over which wireless telegraphy or telephony is practicable. That is, not only are signals heretofore heard from distant stations, greatly increased in intensity, but signals can be clearly read from stations so far away that they had never been read before at such distance. But, in accordance with a preferred object of this invention, the amplified rectified pulses are to operate telegraphic instruments other than telephones, i. e., instruments which do not require to be held to the operator's ear in order to read the signals. I find, however, that even when the amplification is from thirty to forty times, as by the instruments of Figs. 2–6, it is far below the strength required to overcome the inertia of a telegraphic instrument like a Morse sounder. For this reason, and for the stated purpose, it is desirable to cut in at least another amplifier, as $W^2$, $T^2$, with preferably but not necessarily another local source, as a cell of battery $B^2$ like $B^1$. If a common local source is used for a plurality of amplifiers, or for all the receiving devices of Fig. 1, such source should be of very low resistance, as a storage battery, to avoid "cross fire" or interference. Likewise any telephone receiver used in place of amplifier $W^2$, $T^2$, should be of low resistance; or if a high resistance telephone be used, it should be provided with a telephone transformer.

When the second amplifier $W^2$, $T^2$ is employed, the reamplification will be about a thousand, assuming that the first amplification is over thirty, and that the efficiency of $W^2$, $T^2$ is the same as that of $W^1$, $T^1$. This may be sufficient in some cases, but it is preferable for general service, and with the efficiency so far obtained with the devices of Figs. 2–6, to provide at least a third amplifier, as $W^3$, $T^3$, thus finally amplifying to the cube of the amplification of a single device, as $W^1$, $T^1$. On the same assumption as before, the total effect will be an amplification of about thirty thousand. That will be sufficient for most cases, although yet more amplifiers may be added in tandem, if desired, as for any special service.

The next step after sufficient amplification is to change the character of the amplified rectified currents from the pulsatory form to direct makes and breaks. I find that that can be very efficiently done by cutting in a vibrating-contact relay, at $W^4$, $C^2$, of the construction standard in telegraphic or signaling work. The operation of this is as follows, assuming for the present, that $W^6$, Q is to directly operate the ultimate controlling switch, as it may do if desired. The pulsatory amplified rectified currents received in winding $W^4$ act to vibrate a reed or tongue R to and from its contact $C^2$, against which, in the lack of such currents, it is normally held in good contact by spring S. During the vibration of reed R, the tongue Q will not be operated. That is because it is moved only by the average current through its winding $W^6$, and because its inertia causes it to resist the irregularities in the reduced current through $W^6$, which irregularities are caused by the vibration of reed R. But as soon as the pulsatory current through $W^4$ ceases, spring S closes circuit through $W^6$, and tongue or armature Q, upon being drawn to $W^6$, makes a sound indicating the termination of the signal, its sound indicating the commencement of the signal having been made when it receded from $W^6$ under the action of spring $S^1$ when the vibration of reed R commenced. This action is precisely that of the ordinary Morse sounder, except that the sounds indicating the beginning and end of the signal are inverted or reversed. Thus the device $W^6$, Q may be an ordinary Morse sounder or any other desired translating device the circuit of which is closed by reed R. But it is preferable that the Morse sounder or other translating device be located at $W^5$, and that the device $W^6$, Q, interposed between $W^5$ and $W^4$, be a simple Morse relay acting on its back contact, as shown, to invert the makes and breaks caused by reed R so that when reed R is not in vibration the contact $C^3$ is open, and the sounder $W^5$ not energized. There are two principal reasons for this preference. First, a telegraph operator is accustomed to read the signals by the characteristic up-and-down strokes of the sounder, and might be bothered if these were reversed. Second, owing to the relatively large current required for the operation of the sounder, there is danger of the reed R sticking or welding if it is compelled to directly operate the sounder or the switch for the ultimate translating device.

Notwithstanding that the ultimate translating device cannot be satisfactorily operated by the mere amplification of the rectified pulses, such amplification is necessary, and it apparently cannot be effectuated without some such microphonic devices as those of Figs. 2–6.

Fig. 2 shows an efficient microphonic amplifier of what I term the single-contact type, that contact being at $T^1$, 3, corresponding to $T^1$, Fig. 1, and adjustable as indicated. The winding $W^1$ corresponds to $W^1$ of Fig. 1, and the diaphragm $F^1$ to $F^1$ of Fig. 1. Contact member 3 is mounted on diaphragm $F^1$. Contact member $T^1$ is mounted on the end of an adjusting screw in arm 8 which arm is pivoted at 9. A regulating or contact-controlling winding 2 is mounted concentrically with winding $W^1$, the two windings being mounted on their respective spools and located in the common metallic container 1 to which diaphragm $F^1$ is clamped, as shown, as in an ordinary telephone receiver. Permanent magnet 5 is a common magnet for both windings $W^1$ and 2, and supports an adjustable pole-piece 6 which extends up through winding 2 into winding $W^1$ where it is adjusted to within the shortest possible distance of pole-piece 4 which is mounted on diaphragm $F^1$. This construction is of great importance in respect of the efficiency of the device, in that it constitutes a magnetic circuit of extremely low resistance.

The circuit of winding 2 includes the microphone contact $T^1$, 3, diaphragm $F^1$, battery $B^1$ and device $W^2$, one end of winding 2 being connected to metal container 1 and hence to diaphragm $F^1$ clamped to that container. The other end of winding 2 is connected to the cell of battery $B^1$. Device $W^2$ may be another amplifier as in Fig. 1, or it may be a telephone receiver. It is important that the contacts $T^1$, 3 be of the hardest possible conducting material, such as platinum or even the known harder materials whenever the greater expense is no object. I have found an alloy of osmium and irridium to be entirely satisfactory for both $T^1$ and 3.

The mechanical adjustment to microphone action is effected by screw 7, bearing against arm 8 in which contact $T^1$ is mounted. The extension of arm 8 to the right, as shown, permits a very close adjustment, but I have found that to be very inefficient when compared with that which can be additionally obtained by varying the strength of the field of magnet 5, as by rotating the permanent magnet 11 which is located near magnet 5. The user will proceed as follows: After the best possible mechanical adjustment by screw 7, magnet 11 is slowly rotated by hand, so that the slight resulting variations of strength of the field of magnet 5 will result in a very slight additional adjustment of contacts $T^1$, 3. The great improvement in the microphonic action will be readily observed by the action of sounder $W^5$, Fig. 1. This method of additional adjustment is much more delicate than is possible by the mere mechanical adjustment as at 7. A scale 12 may be provided, to indicate definite positions of adjustment of magnet 11.

The action in Fig. 2 is as follows: The flow of current through the microphone $T^1$, 3 and through regulating winding 2 varies the magnetic flux through pole-piece 6, and so varies the pull on pole-piece 4 closely adjacent to 6, thereby slightly varying the position of contact 3 with respect to contact $T^1$. The regulating winding 2 is so connected in circuit that an increase of current flow tends to separate contacts $T^1$, 3, and vice versa, consequently the resistance of the microphonic contact is increased by an increase of current flow, and this in turn automatically reduces the current flow and the pull on pole-piece 4. Consequently, if the adjustment of the microphonic contact is disturbed, so as to cause a variation in current flow, or if the current varies for any reason, the adjustment is automatically restored. Thus, for example, if the resistance of the contact is increased or the current flow is decreased, the pull on pole-piece 4 and diaphragm $F^1$ is reduced so that contacts $T^1$, 3 are in closer adjustment by a most minute degree. Thus the initial adjustment is maintained and the device rendered more stable than a microphone lacking automatic regulation. This automatic control is especially important in connection with the magnetic adjustment by magnet 11, because that adjustment is so extremely fine that it is liable to be put out by the slightest variations of surrounding conditions. Furthermore, this adjustment by magnet 11 is so fine, and the resulting efficiency of the microphone is so great, that I find that the automatic control is liable to be excessive and to overstep the contact-adjustment of maximum efficiency for the purpose, with the result that there is set up a periodic vibration or "singing" of the contacts, as indicated by a characteristic note in a telephone receiver in circuit. This "singing" is objectionable because it interferes with the clear reception of signals, and I have devised a simple means of eliminating it, consisting of the adjustable resistance 10 connected in shunt to the contact-controlling winding 2. Whenever singing follows the adjustment by 7 or 11, the operator simply varies resistance 10 until the singing stops.

In the amplifier of Fig. 3, the electromagnetic control of Fig. 2 is dispensed with, and control is automatically effected by the thermal-wire 13, of any fine high-resistance material, such as a two-mil. manganin wire, of say a couple of inches in length, and adjusted at 14 so as to be stretched tightly for its operative position, this being preferably a permanent adjustment. The resistance adjustment at 10 is in shunt to wire 13, corresponding with its shunt connection to winding 2 in Fig. 2, and is for the same purpose here as in all the figures. The action is as follows: Upon the initial adjustment to microphone contact by screw 7, current flows through T¹, 3, and wire 13. If this current is excessive, i. e., if the microphone contact is of too low resistance for maximum efficiency, then the action is as follows: The slight heating of wire 13 by the current and its consequent slight increase in length allow diaphragm F¹ (to which it is attached near the center thereof) and contact member 3 to fall away to such slight extent from contact T¹, as to increase the resistance to such degree as to improve the microphonic efficiency. This increased separation of the microphonic contacts decreases the current flow, thus limiting the heating and expansion of the wire, and thereby prevents further increase of contact-separation. This method of control is extremely efficient, particularly when combined with the efficient magnetic circuit shown, and described with reference to Fig. 2. The control is so sensitive, with such an efficient magnetic circuit, that the approach of the operator's hand to the wire 13 will instantly cause a wide deflection of the pointer of a milliammeter included in series in the circuit. But notwithstanding this sensitiveness, the automatic adjustment is very stable, and is adequate for commercial service. But the wire 13 preferably is to be shielded from the effects of outside temperature. If desired, diaphragm F¹, in the case of the thermal-wire control, may be replaced by a reed.

In the amplifier of Fig. 4, the control is electrostatic, being effected by the metal ring or annulus 15. The location of this annulus is below and at the shortest convenient distance from diaphragm F¹, and the establishment of a difference of potential between the two, causes an electrostatic attraction or pull on the diaphragm F¹, which results in a slight downward flexing thereof, carrying contact 3 a very slight distance in the direction away from contact T¹. When contact at T¹, 3 is established initially by adjustment of screw 7, current flows through the microphone and through the device W², resulting in an increased difference of potential across W², and hence across the annulus 15 and diaphragm F¹. This increase of potential effects an increase in the electrostatic pull and hence causes an increase in the separation of contacts T¹, 3 and consequently an improvement in the operation of the microphone. At the same time, this increase in contact-separation diminishes the current flow, and the potential, and therefore prevents further pull on diaphragm F¹ by annulus 15.

In Figs. 5 and 6 are shown forms of multiple-point microphones, such as carbon granule buttons 16.

In Fig. 5 the control is by thermal-wire 13, as in Fig. 3. The magnet 5, carrying pole-piece 6, is adjustable in container 1, as shown. The carbon granules 16 are held between diaphragm F¹ and rear electrode 17, the latter having a small central perforation 18 through which wire 13 extends to its attachment to the center of the diaphragm F¹. The resistance-adjustment 10 is provided as in Figs. 2 and 3.

In Fig. 6 the control is electromagnetic as in Fig. 2, the construction being otherwise like Fig. 5.

I have discovered also that the microphone structures of Figs. 2–6 make excellent detectors of high frequency oscillations for use in wireles telegraphy and telephony. For example, Fig. 7 shows the detector D¹ consisting of microphone T¹, 3, controlled by the thermal-wire 13 stretched taut at 14, the general construction being as in the preceding drawings; the mechanical adjustment 7 being indicated only directly at the contact T¹, for simplicity. The microphone is connected between A and G as shown, directly in series in the antenna, this being the preferred connection unless very sharp tuning is required. Contact 3 is mounted on reed R to which control-wire 13 is connected. The automatic control takes this detector out of the ordinary class of microphonic detectors, (which are extremely erratic and unreliable), on account of the resulting stability. The receiving device W² may be the usual telephone receiver or any other suitable device, such as the amplifier W¹ of Fig. 1, or even the Morse sounder W⁵ of Fig. 1. Thus the entire organization at the left of W¹, Fig. 1, may be supplanted by that of Fig. 7, with the exception of W¹, and that no amplifiers W¹, W², etc., Fig. 1 are absolutely required. The operation consists in the variation, by microphonic detector D¹, of the current flow from battery B, with resulting intelligible signals at W². When an amplifier is used, that involves a modification of the general method of Fig. 1, which modification consists in amplifying the variations of the current in battery B which are caused by the microphonic action of detector D¹. Also, inasmuch as the resulting current flow in W² lacks the pulsatory character of that from detector D of Fig. 1, there is no need, as there is in Fig. 1, for the interposition of a vibrating contact relay W⁴, C² between the detector and the ultimate receiving device, as W², Fig. 7, or W⁵, Fig. 1.

In Fig. 8 the thermal-wire 13 is itself the detector D², connected between A and G as shown, directly in series in the antenna, and stretched taut at 14 and mechanically connected to reed R. In this case the detector is an amplifier in which the wire 13 is directly acted upon by the oscillations received by A, G, and the resulting microscopic motions of 13 (caused by heating by the oscillations), are amplified, to operate a receiving device such for example, as the milliammeter W², by means of the variations at microphone T¹, 3 which are caused by the movements of wire 13, the reed R and contact member 3 being allowed to pull away from T¹ by the elongation of wire 13 caused by its heating. The wire 13 has in addition, its action as in Fig. 7, of regulating the microphone T¹, 3, since it is in the local circuit with the battery and microphone, and may be provided with the shunt adjusting resistance 10 as in Fig. 7 and the other figures. The result is that microphone T¹, 3 is automatically adjusted and that the microscopic motions of wire 13 are amplified into the considerable and observable motions of the indicating needle of the milliammeter W².

In Figs. 7 and 8 there is not the need of amplifying devices as is the case with the rectifier detector D of Fig. 1, because in Figs. 7 and 8 the energy used to operate receiving device W² is that of battery B, which may be considerable, whereas in Fig. 1 the energy used to operate W¹ is only that of the oscillations themselves, which require amplification in order to permit the operation of any receiving device except such a sensitive instrument as a telephone receiver.

I claim:

In an amplifier, the combination with a microphone, of a regulating magnet therefor having its coil in circuit therewith, and an adjustable magnet in the vicinity of said regulating magnet for varying the field of the latter.

GREENLEAF WHITTIER PICKARD.

Witnesses:
EDWARD H. ROWELL,
ROLAND BROWNLIE.